UNITED STATES PATENT OFFICE.

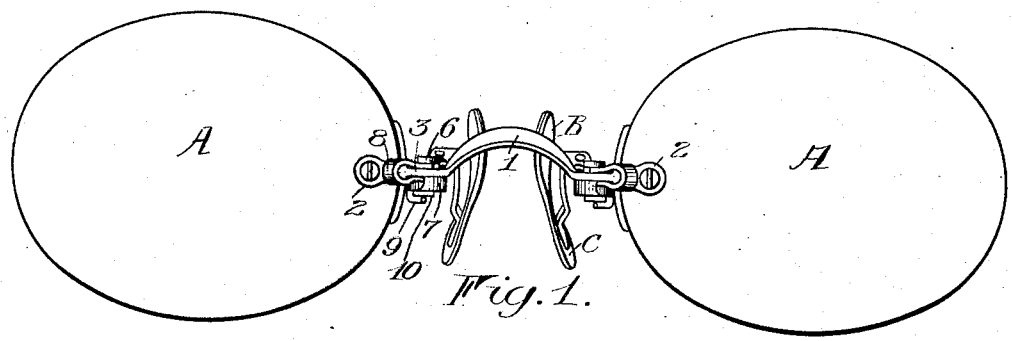
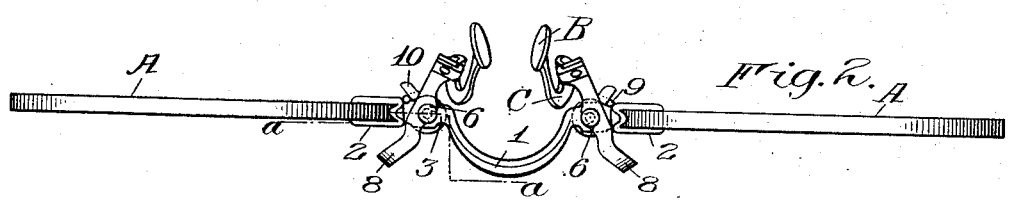
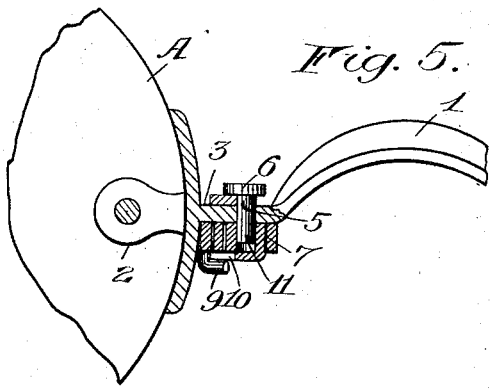
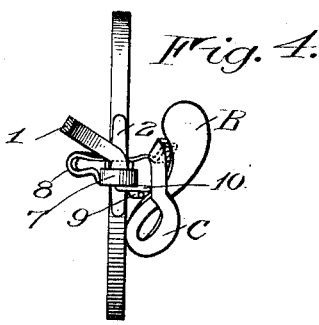

LEO FRANK ADT, OF ALBANY, NEW YORK.

EYEGLASSES.

1,040,094.

Specification of Letters Patent.   Patented Oct. 1, 1912.

Application filed February 14, 1908. Serial No. 415,808.

*To all whom it may concern:*

Be it known that I, LEO F. ADT, of the city of Albany, county of Albany, and State of New York, have invented certain new and useful Improvements in Eyeglasses; and I do hereby declare the following to be a clear, full, and exact description of the same, reference being had to the accompanying drawings, forming a part of this specification, and to the reference-numerals marked thereon.

My present invention relates to eyeglasses of the finger piece type in which the nose guards are mounted to swing on the support and are positioned by suitable springs and it has for an object to provide a construction having but a few simply adjusted parts, so that the labor of assembling and taking down the eyeglasses will be reduced to a minimum.

The invention is further directed toward providing improved springs for positioning the guards that will have a maximum degree of resiliency and will be so placed and connected to the respective parts against which they act as to offer certain conveniences in both applying and removing them.

To these and other ends the invention consists in certain improvements and combinations of parts, all as will be hereinafter more fully described, the novel features being pointed out in the claims at the end of the specification.

In the drawings: Figure 1 is an enlarged view of an eyeglass constructed in accordance with and illustrating one embodiment of my invention; Fig. 2 is a top view of the same embodiment; Fig. 3 is a bottom view; Fig. 4 is a central transverse section; Fig. 5 is a section on the line 2—2 of Fig. 2, and Fig. 6 is a perspective view of one of the nose guards.

Similar reference numerals throughout the several figures indicate the same parts.

In both illustrated embodiments of the invention the lenses A are rigidly connected by a support bridging the nose of the wearer and the nose guards are mounted to swing on the support toward and from the nose.
In Figs. 1 to 6 the support consists of a bridging portion 1, integral with the lens attaching devices 2, and preferably has its upper surface formed with horizontal seats 3 near the lens attaching devices. On these seats are mounted the nose guards or finger piece levers which swing substantially in a horizontal plane toward and from the nose at their rear ends and have upper and lower nose engaging pads B and C located at these points.
Each guard is moved toward and from the nose by a coil spring 7 preferably of flat spiral form, arranged in the present instance below the support with its axis vertical and coincident with the turning axis of the guard. The springs are preferably carried by the guard so that when the latter are removed from the support the springs will be carried on them, thus facilitating the repair of the eyeglasses and the substitution of pair of the eyeglasses and the substitution of guards of other sizes and formations to fit individual noses. In the present instance, each spring is formed in one piece with portions of the nose guard in order, among other reasons, to reduce the number of parts to be handled and the conspicuousness of the eyeglasses and for this purpose the levers which project longitudinally forwardly and rearwardly from the plane of the lenses and carry the bearings 4 and nose bearing portions B—C form, in each instance, one arm of a loop 8 and the other arm of such loop is extended downwardly toward the plane of the spring coil and merged into the outer end or the outer convolution thereof which thereby forms a continuation of the lever. The material from which both parts are produced is preferably a ribbon of flat stock and the bend both at the loop 8 and at the point of connection of the guard and coil are in a flatwise direction for purposes later referred to.

The springs interlock with the support in a manner to retain the bearings 4 of the guard in engagement with the bearing 5 of the support and for this purpose there are employed interlocking connections each preferably consisting of a shoulder 9 below the bridging portion carried by the latter and an arm 10 extending rearwardly and outwardly from the inner end of a coil across the latter or in other words from an inner convolution across an outer convolution and held at its free end in engagement with the adjacent portion of the support, above the shoulder, by the spring action of the coil.

In the specific structure shown the shoulder 9 is constituted by the lower hooked end of a depending free arm on the support extending through the plane of the coil exteriorly thereof, as shown, and independently of both the bridge and lens attaching portion so that a proper engagement is offered the spring whatever change may be made in the positions of these parts. By also bending the inner spring arm 10 flatwise of the stock and disposing its flat side against the face of the coil that it crosses, I make it hug the coil very closely so that it is not necessary to bring the shoulder 9 down very far in order to coöperate with it and the vertical extent of the spring in the direction of its axis is materially condensed to which end the other flatwise bends previously referred to, contribute. It is advantageous to run the arm 10 radially or diametrically from the far side of the inner convolution, as shown, so that it passes through the axis, one of the reasons of this being that the inner convolution is thereby flexed inwardly toward the center rather than otherwise with the result that there is no tendency for it to prevent the free inward flexing or contracting of an intermediate or outer convolution.

Referring back to the flat disposal of both ends of the spring it is furthermore pointed out that by thus arranging them as nearly identical in extent with the plane of the coil as possible there is little tendency on their part to distort the coil as a whole from its plane of flexing movement, but to further provide for holding the coils against lateral displacement, projections 11 extend beyond the under surface of the support into the respective coils and are in this instance each formed in one piece with a pivot pin 5.

In operating the eyeglasses to remove them from the nose or fit them thereto, the forwardly extending operating portions of the guards are pressed together, thus causing a separation of their nose bearing portions, and when the operating portions are released the guards move toward each other under the action of the springs. The guards may be removed from the support by moving the arm 10 from above the shoulder, and then disengaging the bearings 4 and 5.

Eyeglasses constructed in accordance with this invention are inexpensive to manufacture owing to the fact that the number of parts is reduced to a minimum. The fitting of the eyeglasses by the optician is facilitated because but a few manipulations are required to mount and remove a guard and its spring. The support may be adapted to different noses and to different pupillary distances, and the means permitting this result does not render the eyeglass conspicuous. Particularly is the attachment and detachment of the spring facilitated as the free radial arm is easily engaged or disengaged and the spring is applied when not under tension and later placed under tension.

I claim as my invention:

1. In eyeglasses, the combination with a support, a finger piece nose guard, and coöperating bearing members on the guard and the support, pivotally and detachably connecting them, of a coil spring for positioning the guard, carried by the latter and having its axis coincident with the turning axis of the guard, and interlocking connection between the spring and the support, held in engagement by the spring to retain the bearing members in engagement.

2. In eyeglasses, the combination with a support, and a pivoted finger piece nose guard mounted to swing on the support substantially in a horizontal plane and embodying a lever carrying a nose bearing portion at its rear end, of a coil spring arranged with its axis coincident with the pivot of the lever, formed in one piece with the lever and having interlocking connection with the support, held in engagement by the action of the spring.

3. In eyeglasses, the combination with a support and a pivoted finger piece nose guard mounted to swing on one side of the support substantially in a horizontal plane, of a flat spiral coil spring arranged on the opposite side of the support with its axis coincident with the turning axis of the guard, connected to and carried by the guard at its outer end and having its inner end interlocked with the support.

4. In eyeglasses, the combination with a support, a finger piece nose guard and coöperating pivot bearings on said parts permitting the guard to swing on the support substantially in a horizontal plane, of a coil spring arranged with its axis coincident with the turning axis of the nose guard and having one end secured to the nose guard to be removed therewith and its other end provided with an arm held against the support by the action of the spring coil.

5. In eyeglasses, the combination with a support, of a finger piece nose guard comprising a lever pivotally mounted to swing on the support, substantially in a horizontal plane, nose bearing portions carried by the rear end of the lever and an arm extending from the lever, a flat spiral spring carried by the arm and having its axis coincident with the turning axis of the guard, and interlocking connection between the spring and the support held in engagement by the action of the spring.

6. In eyeglasses, the combination with a support, of a finger piece nose guard comprising a forwardly projecting loop having one arm pivotally mounted to swing on one side of the support substantially in a horizontal plane, a nose bearing portion carried by the rear end of the said arm, a flat spiral coil spring arranged beneath the support forming a continuation of the other arm of the loop, and interlocking connection between the spring and the support held in engagement by the spring.

7. In eyeglasses, the combination with a support having a pivot projecting upwardly therefrom and a spring retaining projection depending from its lower side, of a finger piece nose guard comprising a forwardly projecting loop having one arm formed with a lateral recess receiving the pivot, nose bearing portions on the rear end of the recessed arm, a flat spiral spring surrounding the retaining projection and having its outer end forming a continuation of the other arm, and an arm extending from the inner end of the spring and coöperating with the support.

8. In eyeglasses, the combination with a support, of a finger piece nose guard comprising a forwardly projecting loop having one arm pivoted to the support and a nose bearing pad carried by the rear end of the pivoted arm, a flat spiral spring arranged with its axis coincident with the pivot of the loop and having its outer end forming a continuance of the other arm of the loop, and an arm projecting from the inner end of the spring and coöperating with the support.

9. In an eyeglass mounting, the combination with a support having a bearing member and a finger piece nose guard having a bearing member pivotally and removably engaging the bearing member on the support, of a coil spring carried by and removable with the guard with its axis alined with the turning axis of the said guard and having interlocking connection with the support held in engagement by the action of the spring.

10. In an eyeglass mounting, the combination with a support for the lenses, of a nose guard embodying a lever formed of flat stock with its flat faces horizontally arranged having a finger piece at its forward end and a nose engaging member at its rear end, and a spring for the guard formed of flat stock and integrally with the lever, the spring being of flat spiral form arranged about a vertical axis and below the lever and having one end secured to the lever and an arm at the other end bearing loosely against the mounting.

11. As an article of manufacture, a nose guard for eyeglasses comprising a guard lever having a finger portion, nose engaging portion and an intermediate bearing portion and a positioning spring forming a continuation of said lever coiled in a flat spiral in axial alinement with the bearing portion and provided with a part adapted to coöperate with the guard support, said part being extended from the inner convolution of the spring.

12. In an eyeglass mounting, the combination with a support for the lenses and a finger piece guard lever having a pivotal bearing thereon, of a coil spring for positioning the guard wound in a flat spiral about the axis thereof, the outer end being arranged to act upon the guard and the inner end being provided with an arm extended outwardly radially of the spiral and acting against the support.

13. In an eyeglass mounting, the combination with a support for the lenses and a finger piece guard lever having a pivotal bearing thereon, of a coil spring for positioning the guard wound in a flat spiral about the axis thereof, the outer end being arranged to act upon one of said members and the inner end being provided with a free arm extended from an inner convolution across an outer convolution of the spiral and detachably engaging against the other member.

14. In an eyeglass mounting, the combination with a support for the lenses and a finger piece guard lever having a pivotal bearing thereon, of a coil spring for positioning the guard wound in a flat spiral about the axis thereof, the outer end being arranged to act upon one of said members and the inner end being provided with a free arm extending through the axis of the guard and acting against such other member.

15. In an eyeglass mounting, the combination with a support for the lenses and a finger piece guard lever having a pivotal bearing thereon, of a coil spring for positioning the guard composed of a strip of flat material wound flatwise about the axis of the guard in a flat spiral, the outer end being arranged to act upon one of the members and the inner end being formed into a free arm acting against the other with its flat side parallel with the plane of the coil and extending through the axis thereof.

16. In a finger piece eyeglass mounting, the combination with a support for the lenses and a finger piece guard lever having a pivotal bearing thereon, of a coil spring for positioning the guard wound in a flat spiral about the axis thereof, the outer end being arranged to act upon the guard and the inner end being provided with an arm proceeding from an inner convolution and extended across an outer convolution of the spiral and acting against the support.

17. In an eyeglass mounting, the combination with a support for the lenses, a guard lever having a pivotal bearing thereon and a projection on the support arranged in the axis of movement of the guard, of a coil spring for positioning the guard wound in a flat spiral about the projection, the outer end being arranged to act upon the guard and the inner end being provided with an arm extended outwardly radially of the spiral and acting against the support.

18. In an eyeglass mounting, the combination with a support and a finger piece guard lever pivotally mounted thereon to swing in a substantially horizontal plane, of a spring for positioning the guard coiled in a flat spiral about the axis thereof, and an arm proceeding from the guard lever toward the plane of the spiral coil and connected to the outer end thereof.

19. In an eyeglass mounting, the combination with a support comprising a bridging portion, a lens attaching portion and a connecting portion, of a finger piece guard lever arranged to turn on the support, a spring for positioning the guard having one end acting against the latter and the other against the support and means on the support engaging said last mentioned end comprising a free arm carried by the connecting portion independently of the bridge and lens attaching portion.

LEO FRANK ADT.

Witnesses:
EDWARD MURPHY, 2d,
CHARLES S. ALDRICH.

Copies of this patent may be obtained for five cents each, by addressing the "Commissioner of Patents Washington, D. C."